Oct. 20, 1953 S. P. LAGANT 2,655,957
FLEXIBLE SHAFT DRIVEN TREE TRIMMER POWERED
BY A MOTOR TOWED BY THE OPERATOR
Filed May 11, 1950 3 Sheets-Sheet 2

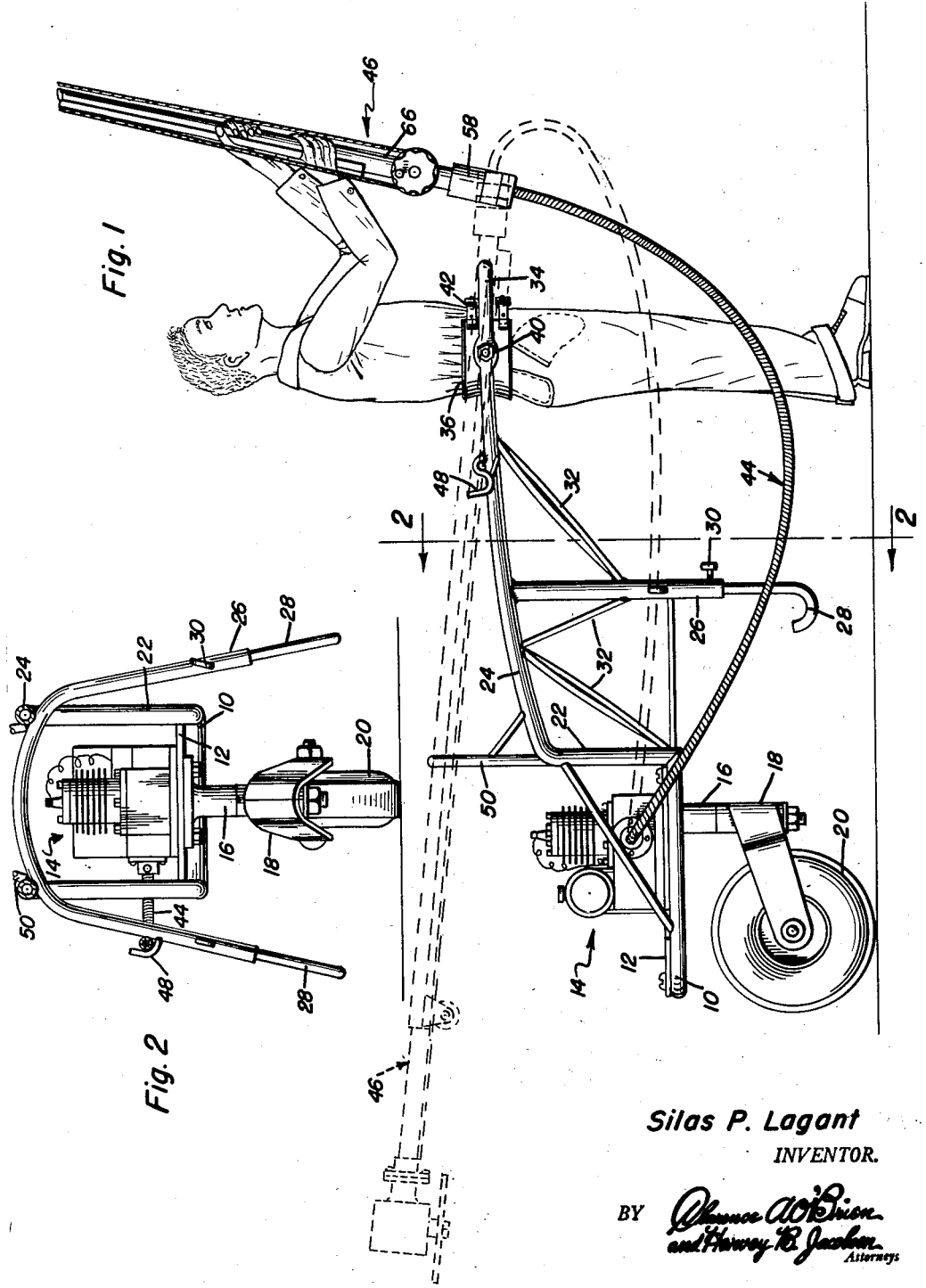

Silas P. Lagant
INVENTOR.

BY

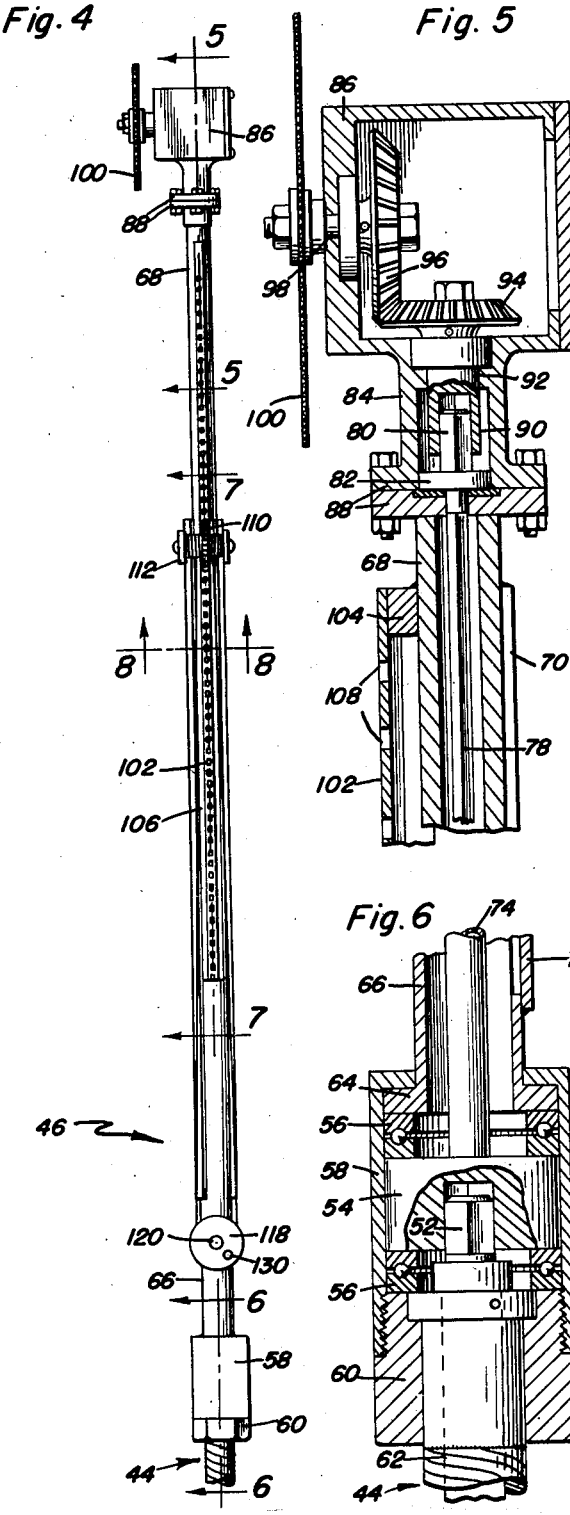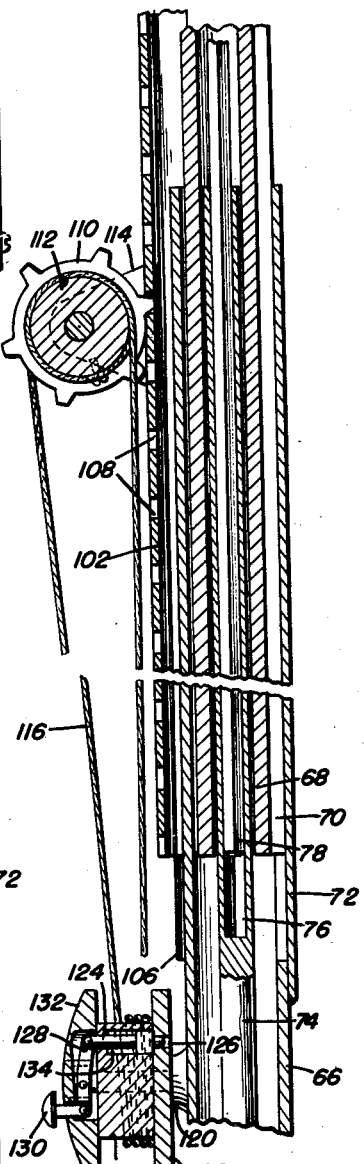

Patented Oct. 20, 1953

2,655,957

UNITED STATES PATENT OFFICE 2,655,957

FLEXIBLE SHAFT DRIVEN TREE TRIMMER POWERED BY A MOTOR TOWED BY THE OPERATOR

Silas P. Lagant, Pocahontas, Ill.

Application May 11, 1950, Serial No. 161,333

6 Claims. (Cl. 143—43)

This invention relates generally to power driven tools and more particularly to apparatus for trimming trees.

A primary object of the invention is to provide means whereby an operator can trail a small power plant with him as he moves around a tree, the apparatus including an extensible pole upon the upper end of which is a rotary saw or like tool driven by said power plant, the operator's hand being free to manipulate the said pole as the operator moves around the tree.

Another object of this invention is to provide specific means whereby a carriage for the above mentioned power plant is made connectible to the operator, so that by movement of the operator's body the carriage can be pushed and pulled and turned in any desired direction, all without the employment of the operator's hands.

Still another object of this invention is to provide a carriage for the power plant of a tree trimming apparatus, which is provided with retractible and extendable legs, as well as a ground-contacting caster wheel, so that the carriage will remain upright when it is detached from the operator.

Another object of the invention is to provide improved harness means for securing a carriage of the type mentioned above to an operator, and to provide improved extensible mast or pole and telescoping drive elements, whereby the device can be adjusted for use under varying conditions.

A last object to be mentioned specifically is to provide a tree trimming apparatus which is relatively inexpensive and practicable to manufacture, which is simple, safe and convenient to use, and which will give generally efficient and durable service.

With these objects definitely in view, this invention resides to certain novel features of construction, combination and arrangement of elements and portions as will be hereinafter described in detail in the specification, particularly pointed out in the appended claims, and illustrated in the accompanying drawings which form a material part of this application, and in which:

Figure 1 is a side elevational view of the apparatus in operation, a portion of the tool assembly being broken away to conserve space;

Figure 2 is a vertical sectional view taken on the line 2—2 in Figure 1;

Figure 4 is an elevational view of the tool assembly in partially extended position;

Figure 5 is an enlarged vertical sectional view taken substantially on the line 5—5 in Figure 4;

Figure 10:
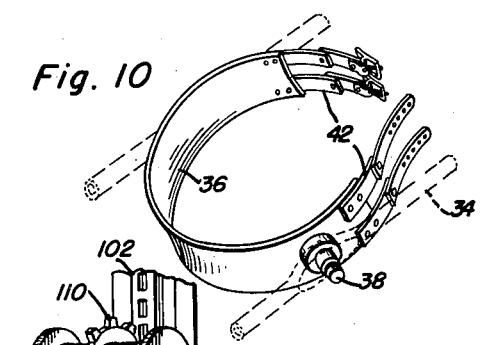
Figure 9:
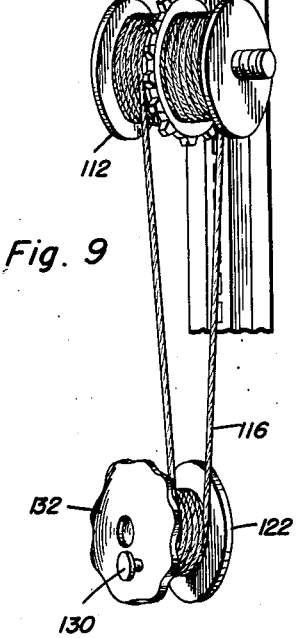
Figure 8:
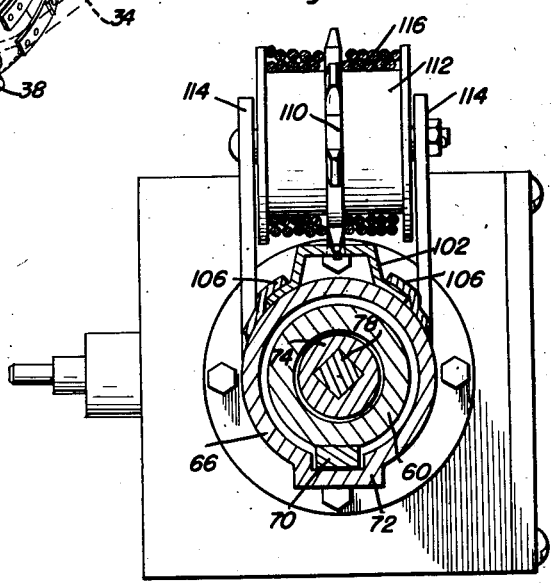

Figures 6 and 7 are similar fragmentary vertical sectional views taken on the corresponding lines 6—6 and 7—7 in Figure 4;

Figure 8 is a horizontal sectional view taken on the line 8—8 in Figure 4 and looking in the direction of the arrows;

Figure 9 is a fragmentary perspective view showing the means used for extending and collapsing the pole elements; and Figure 10 is a view in perspective of the waistband, the view including, in dash lines, representations of the handle bars upon which the waistband is supported.

Similar characters of reference designate similar or identical elements and portions throughout the specification and throughout the different views in the drawings.

Referring now to the drawings in detail, this invention includes a carriage having a rigid frame 10 which is preferably constructed from tubular stock, and a platform 12 is provided on the frame to support a power plant generaly indicated by the numeral 14 and ordinarily including a gasoline engine which is diagrammatically represented. The frame includes a depending post 16 upon which is mounted a caster 18 having a ground-contacting wheel 20 which will preferably be pneumatic tired. The frame also includes extending arm portions 24 upwardly offset from the main portion 10 of the frame by vertical frame portions 22. The frame also includes a pair of laterally disposed and preferably downwardly diverging legs 26 having ground-contacting extensible feet 28 secured in adjusted positions by set screws 30, the shank portions of the feet 28 being telescopically mounted within the legs 26 which are hollow. A complement of braces 32 are used to keep the frame and the portions thereof rigid and a pair of handle bars 34 extend in substantially parallel relation from the outer ends of the bar members 24.

A waistband comprising a substantially semi-circular portion 36, constructed of relatively inflexible material, and pairs of flexible straps 42, is used to support the handle bar 10 of the carriage upon the waist portion of an operator. If reference be had to Figure 10, it will be noted that the semi-circular portion 36 is curved transversely thereof to fit the waist of the operator more comfortably. A pair of trunnions 38 are rigidly secured in opposing relation on the exterior of the semi-circular portion 36, these trunnions extending through apertured portions of the handle bars 34 where said handle bars join the frame of the carriage, the trunnions being terminally threaded to receive clamping nuts 40.

Figure 3:
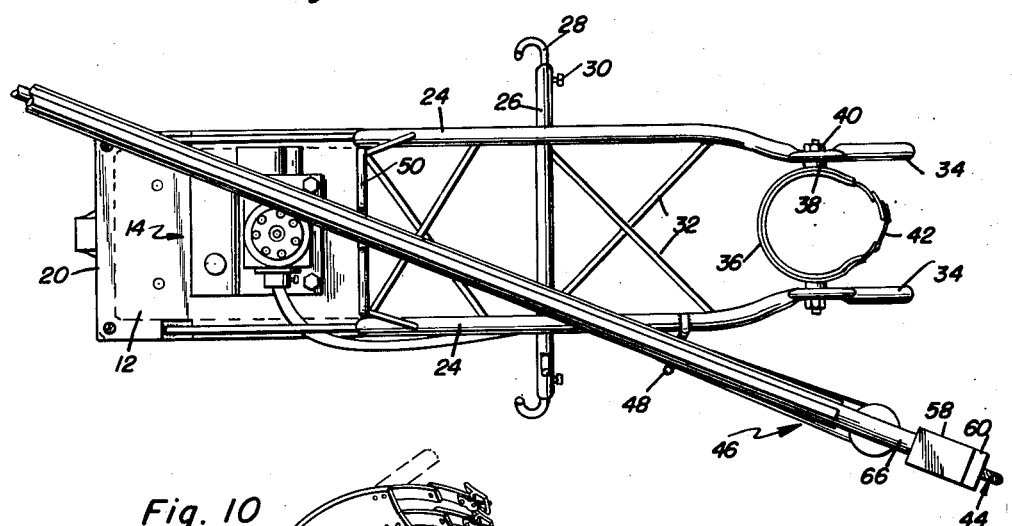
Figure 3 is a top plan view of the apparatus, the tool assembly being shown fragmentarily and positioned as stored on top of the carriage when not in use.

The power plant 14 drives a flexible cable 44 which is operatively connected, as will be described hereinafter, with a tool assembly 46, and it will be noted that the tool assembly 46 may be supported upon a hook 48 and a simple rack 50 which are rigidly secured to the bar members 24, the inoperative positioning of the tool assembly being illustrated in dash lines in Figure 1 and again in Figure 3.

The tool assembly 46, illustrated in detail in Figures 4-9, includes a driving head 52 rigidly connected to the end of the flexible cable 44, this driving head being received in a socket member 54 rotatably mounted between bearings 56 within a cylindrical casing 58, which is rigidly secured, as by means of the nut 60, to the non-rotating armor 62 of the flexible cable 44. The extensible mast or pole of the tool assembly 46 includes the outer telescoping tubular element 66 and the inner tubular telescoping element 68, both of which are of inflexible material, and the outer element 66 is provided with attachment flanges 64 which are clamped between one of the bearings 56 and an end wall of the casing 58. The outer element 66 has rigidly secured thereon a longitudinally extending keyway 72 which receives an elongated key 70 which is rigidly secured longitudinally of the inner pole element 68.

An elongated tubular outer drive element 74 is rigidly secured at one end to the socket member 54, the bore of the drive element 74 being non-circular in cross-section, as best illustrated at 76 in Figure 7, to receive an inner elongated drive element 78 which terminates in a driving head 80 having an enlargement 82 rotatably mounted within the neck portion 84 of a housing 86, the neck portion and the outer end of the inner pole element 68 having opposing attachment flanges 88, whereby the housing 86 is mounted on the said outer end of the inner pole element 68. A socket member 90 is provided on one end of a short shaft 92 rotatably mounted in the housing 86, and a beveled gear 94 is rigidly secured to the outer end of the shaft 92. A coacting beveled gear 96 is rigidly secured to a second short shaft 98 which is mounted at right angles to the shaft 92 and in the housing 86, this second shaft 98 having a rotary saw 100, or a similar tool, removably mounted thereon.

Means for extending and collapsing the tool assembly 46 will next be described. An elongated rack 102 is rigidly secured exteriorly of the inner pole element 68, as best illustrated at 104 in Figure 5, and rack guides 106 are rigidly secured to the outer pole element 66, as will be clearly understood from a consideration of Figure 8 (Sheet 2). The rack 102 has spaced apertures 108 to receive the teeth of a pinion 110, this pinion being carried by a reel 112 rotatably mounted on brackets 114 carried by an outer end portion of the outer pole element 66. A cable 116 is wound upon the reel 112 and upon a second reel 118 which is rotatably mounted upon a spindle assembly 120 rigidly secured to an end portion of the outer pole element 66 adjacent to the casing 58. It should be particularly noted that the spindle assembly 120 includes a fixed plate 122 and the reel 118 is provided with a locking plunger 124 which is selectively insertable terminally into a plurality of radially spaced apertures 126, one of which is shown in Figure 7, the plunger 124 being actuated by a rocker 128 and a push button 130, the push button extending to the outer face of the cable guard plate 132 of the reel 118. The plunger 124 is biased into engagement with the apertures 126 by a spring 134.

The operation of this invention will be clearly understood from a consideration of the foregoing description of the mechanical details thereof, taken in connection with the above recited objects and the drawings. In recapitulation, it will be clear that the power plant 14 will provide motivation of the flexible cable 44 and the power is transmitted thence to the outer drive element 74 and the inner drive element 78, so that the saw 100 or similar tool will be operated. It will be clear that the inner drive element 78 can move longitudinally with reference to the outer drive element 74 and the inner and outer pole elements 68 and 66 prevent relative rotation of the housing 86 and the casing 58, while allowing extension and collapsing of the tool as required by the operator. It will also be clear that depression of the button 130 will allow the reel 118 to be turned, thus activating the pinion 110 and the rack 102 so that the inner pole element 68 is moved relative to the outer pole element 66 as desired, release of the button 130 allowing the spring 134 to lock the plunger 124 on the fixed plate 122 and preventing inadvertent collapsing of the tool assembly 46. As to the operation of the carriage, it is believed no further explanation is required, it being clear that when the waistband is removed from the operator, the adjustable feet 28 will support the carriage against tipping. Other minor details of operation will be clear to any one skilled in the art to which this invention appertains and further description would appear unnecessary.

Having described the invention, what is claimed as new is:

1. For use in an apparatus for trimming trees a carriage comprising a single caster wheel and an extending portion, a harness secured on said portion and adapted to be fastened on the body of an operator, whereby the carriage can be made to trail the operator, said harness comprising a waistband including a substantially semi-circular portion, flexible straps secured to the ends of the semi-circular portion and a pair of trunnions on said semi-circular portion engaging said extending portion.

2. In apparatus for trimming trees comprising a carriage having a single caster wheel and an extending portion, a harness secured on said portion and adapted to be fastened on the body of an operator, whereby the carriage can be made to trail the operator, said harness comprising a waistband including a substantially semi-circular portion, flexible straps secured to the ends of the semi-circular portion, a pair of trunnions on said semi-circular portion engaging said extending portion, a motor on said carriage, a flexible cable driven by said motor, and a tree trimming tool operatively connected with said cable.

3. In apparatus for trimming trees comprising a carriage having a single caster wheel and an extending portion, a harness secured on said portion and adapted to be fastened on the body of an operator, whereby the carriage can be made to trail the operator, a motor on said carriage, a flexible cable driven by said motor, and a tree trimming tool operatively connected with said cable comprising outer and inner telescoping pole elements having corresponding outer and inner telescoping drive elements rotatively mounted in said pole elements, the outer drive element being connected to said cable, a housing on the outer end of the inner pole element, a rotary tool operatively mounted on said housing and connected with said inner drive element, and means to extend and collapse said pole and drive elements.

4. In apparatus for trimming trees having a carriage adapted to be fastened on the body of an operator, whereby the carriage can be made to trail the operator, a motor on said carriage, and a flexible cable driven by said motor, a tree trimming tool operatively connected with said cable comprising outer and inner telescoping pole elements having corresponding outer and inner telescoping drive elements rotatively mounted in said pole elements, the outer drive element being connected to said cable, a housing on the outer end of the inner pole element, a rotary tool operatively mounted on said housing and connected with said inner drive element, a key fixed on one of said pole elements, a coacting keyway on the other of said pole elements, a rack fixed on said inner telescoping element and extending over the outer surface of said outer telescoping pole element, a guide on said outer element for said rack, and a pinion mounted on said outer pole element and operatively engaged with said rack and means to drive said pinion.

5. In apparatus for trimming trees having a carriage, a harness secured on said carriage and adapted to be fastened on the body of an operator, whereby the carriage can be made to trail the operator, a motor on said carriage, and a flexible cable driven by said motor, a tree trimming tool operatively connected with said cable comprising outer and inner telescoping pole elements having corresponding outer and inner telescoping drive elements rotatively mounted in said pole elements, the outer drive element being connected to said cable, a housing on the outer end of the inner pole element, a rotary tool operatively mounted on said housing and connected with said inner drive element, means for inhibiting relative rotation between said inner and outer telescoping pole elements, a rack rigidly secured to the inner pole element and extending in sliding engagement with the outer surface of said outer pole element, a guideway on said outer pole element for said rack, a pinion mounted on said outer pole element in driving engagement with said rack, and driving means associated with said pinion.

6. In apparatus for trimming trees having a carriage having an extending portion, a harness secured on said extending portion and adapted to be fastened on the body of an operator, whereby the carriage can be made to trail the operator, a motor mounted on said carriage, and a flexible cable driven by said motor, a tree trimming tool operatively connected with said cable comprising outer and inner telescoping pole elements having corresponding outer and inner telescoping drive elements rotatively mounted in said pole elements, the outer drive element being connected to said cable, a housing on the outer end of the inner pole element, a rotary tool operatively mounted on said housing and connected with said inner drive element, means for inhibiting relative rotation between said inner and outer telescoping pole elements, a rack rigidly secured to the inner pole element and extending in sliding engagement with the outer surface of said outer pole element, a guideway on said outer pole element for said rack, a pinion mounted on said outer pole element in driving engagement with said rack, a hand operated reel mounted on the base of said outer telescoping pole element, a reel secured on said pinion, a flexible driving element operatively connecting said reels, a safety locking plunger in said hand operated reel, said plunger being biased to locking position, and a release button extending to the outer face of said reel.

SILAS P. LAGANT.

References Cited in the file of this patent

UNITED STATES PATENTS

| Number | Name | Date |
|---|---|---|
| 673,105 | Young | Apr. 30, 1901 |
| 1,520,330 | Chinn | Dec. 23, 1924 |
| 1,602,357 | Georgelis | Oct. 5, 1926 |
| 2,490,255 | Chase | Dec. 6, 1949 |

FOREIGN PATENTS

| Number | Country | Date |
|---|---|---|
| 255,007 | Great Britain | July 15, 1926 |